C. E. SMITH.
BEAN PICKING MACHINE.
APPLICATION FILED FEB. 20, 1913.
1,079,805.
Patented Nov. 25, 1913.
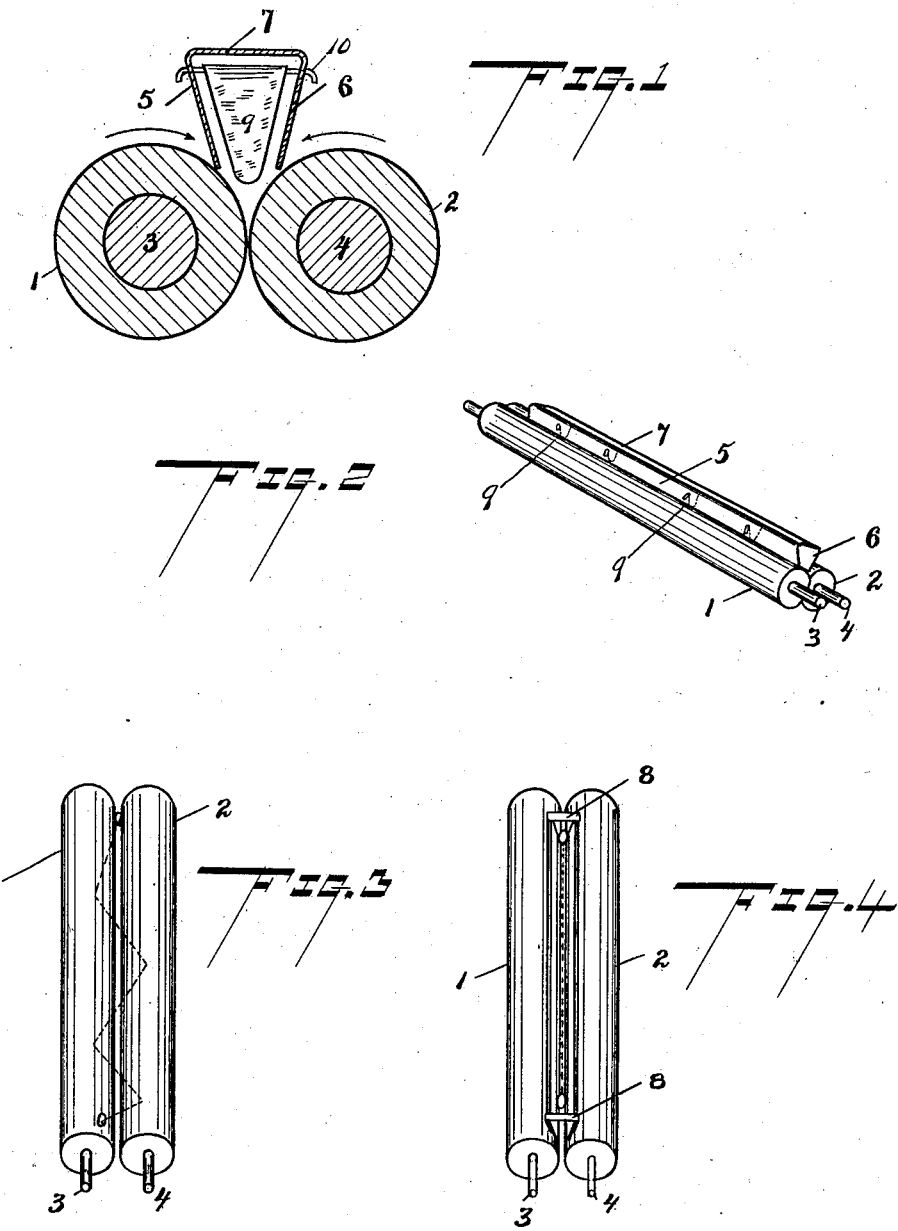
WITNESSES:
INVENTOR
Charles E. Smith
BY
Geo. B. Willcox
ATTORNEY

UNITED STATES PATENT OFFICE.

CHARLES E. SMITH, OF SAGINAW, MICHIGAN, ASSIGNOR OF ONE-FOURTH TO GUSTAVE R. MEYER, OF SAGINAW, MICHIGAN.

BEAN-PICKING MACHINE.

1,079,805.  Specification of Letters Patent.  Patented Nov. 25, 1913.

Application filed February 20, 1913. Serial No. 749,697.

*To all whom it may concern:*

Be it known that I, CHARLES E. SMITH, a citizen of the United States, residing at Saginaw, in the county of Saginaw and State of Michigan, have invented certain new and useful Improvements in Bean-Picking Machines; and I do hereby declare the following to be a full, clear, and exact description of the invention, such as will enable others skilled in the art to which it appertains to make and use the same.

This invention relates to bean picking machines and pertains more particularly to that class of bean picking machines in which pairs of rolls are employed, the rolls being placed close together side by side and adapted to be rotated in opposite directions, so that the upper peripheries of the rolls of a pair turn toward each other. In this class of bean picking machines it has heretofore been customary to arrange the rolls at an incline and to feed the beans to them by any suitable feeding device that delivers the beans in a uniform manner to the upper end of the groove or channel formed by the upper peripheries of the two rolls. It has been found in practice that beans when fed to the upper ends of the rolls as just described will be properly picked if they are compelled to travel down along the groove formed by the two rolls, and that the thoroughness or efficiency of the picking operation depends directly upon the closeness of contact between each individual bean and the two rolls down which it travels. It has been found in practice that the greatest part of the work is done usually at the upper ends of the rolls, for the reason that it is at this point that the greatest number of beans come into most intimate contact with the moving surfaces of the rolls. Farther down the rolls the beans have a tendency to increase the speed and to bound or vibrate from side to side and a considerable percentage of them will thus bound the entire length of the rolls and a considerable quantity of split or imperfect beans will thereby be permitted to pass along the rolls and be delivered with the good beans, thus greatly impairing the efficiency of the picking operation. To reduce the possibility of beans bounding entirely clear of the rolls, flat plates have sometimes been placed above the rolls, but these plates do not have any great affect in maintaining the proper contact between the individual beans and the rolls, which contact is an essential requirement for efficient work.

My improvement comprises means for maintaining proper contact between the beans and the rolls throughout the entire length of the rolls and for checking the speed of the beans, so that each bean is required to travel down the groove in intimate contact with the revolving surfaces and if the bean is rough or split it will be drawn through the rolls and if it is smooth and perfect will be delivered at the ends of the rolls.

My invention comprises the devices described and claimed and the equivalents thereof.

In the drawings forming part of this specification, Figure 1 is a transverse section through a pair of rolls with my improvement applied; Fig. 2 is a perspective view of a pair of rolls with my improvement attached; Fig. 3 is a view of a pair of rolls showing the erratic manner in which beans naturally travel down the rolls; and Fig. 4 is a similar view showing the manner in which the beans travel when my improvement is used in combination with the rolls.

In the drawings, 1 and 2 represent the rolls, which are revoluble in the directions indicated by the arrows.

3 and 4 represent the shafts of the rolls.

My improvement provides a pair of baffles 5, 6, which may be made of sheet metal or any other suitable material. These baffles extend lengthwise the rolls and their lower edges project well between the rolls as shown in Fig. 1, while their upper edges may if desired be farther apart. In practice I prefer to make the two baffles of a single piece of metal connected together by a cover 7, the two sides and the cover forming practically an inverted trough. The cover, however, is not essential, as it is only necessary for the successful operation of my improvement that the two baffles be provided and so located that all the beans will be guided by them into close contact between the peripheries of the rolls while they are traveling down the rolls, as shown in Fig. 4, as distinguished from the manner in which the beans travel down a pair of rolls not equipped with the baffles, as illustrated in Fig. 3. When the cover 7 is not used, the baffles 5 and 6 may be held in position in any suitable or convenient manner, as by connecting bars 8, shown in Fig. 4. To check the tendency of the beans to increase their velocity as they travel down the rolls, I prefer to provide a plurality of swinging members of any suitable construction, as for illustration, plates 9, each preferably formed of a strip of metal pivotally mounted at its upper end to the baffles 5, 6, as shown at 10 in Fig. 1. The lower ends of the swinging plates slightly retard the flow of beans, but do not obstruct the operation of the rolls.

By the means above described I have provided a simple and inexpensive device that retains all of the beans in close contact with the working surfaces of the rolls and insures that each individual bean will be properly acted upon by the rolls at some point during its downward travel.

It has been found in practice that where proper picking can not be accomplished by less than two or three passages of a lot of beans through rolls that are not equipped with these baffles, a single passage through rolls having the baffles will suffice to provide almost perfect picking.

Having described my invention, what I claim and desire to secure by Letters Patent is:

1. In combination with a pair of revoluble bean picking rolls, a pair of substantially vertical oppositely disposed baffles having their lower edges projecting downwardly between, but out of contact with the rolls, the lower edge of each baffle being adjacent the periphery of one of said rolls, but out of contact therewith, the lower edges of the baffles spaced apart farther than the width of a bean, the upper edges of said baffles projecting above said rolls, and a cover for said baffles for the purposes set forth.

2. In combination with a pair of revoluble bean picking rolls, a pair of substantially vertical baffles extending lengthwise said rolls and having their lower edges projecting between said rolls, but out of contact therewith and a cover connecting the upper edges of said baffles.

3. In combination with a pair of revcluble bean picking rolls, a pair of substantially vertical oppositely disposed baffles having their lower edges projecting part way between the rolls. but out of contact therewith, the lower edge of each baffle being adjacent the periphery of one of said rolls, and a plurality of freely suspended swinging members between said baffles, the lower ends of said members located out of contact with the rolls, above the path of travel of beans when passing down the groove in proper contact with the peripheries of said rolls, said members adapted to yieldingly retard those beans that bound above the rolls.

In testimony whereof I affix my signature in presence of two witnesses.

CHARLES E. SMITH.

Witnesses:
JOSEPH V. CARPENTER,
NELLIE M. ANGUS.

---

Copies of this patent may be obtained for five cents each, by addressing the "Commissioner of Patents, Washington, D. C."